United States Patent
Lee et al.

(10) Patent No.: US 11,528,746 B2
(45) Date of Patent: Dec. 13, 2022

(54) METHOD FOR HANDLING PRE-CONFIGURED UL RESOURCES BASED ON LBT PROCEDURE IN WIRELESS COMMUNICATION SYSTEM AND A DEVICE THEREFOR

(71) Applicant: LG Electronics Inc., Seoul (KR)

(72) Inventors: Sunyoung Lee, Seoul (KR); Gyeongcheol Lee, Seoul (KR); Jeonggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 16/633,697

(22) PCT Filed: Aug. 7, 2018

(86) PCT No.: PCT/KR2018/008924
§ 371 (c)(1),
(2) Date: Jan. 24, 2020

(87) PCT Pub. No.: WO2019/031796
PCT Pub. Date: Feb. 14, 2019

(65) Prior Publication Data
US 2021/0112592 A1    Apr. 15, 2021

Related U.S. Application Data

(60) Provisional application No. 62/544,004, filed on Aug. 11, 2017.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/042* (2013.01); *H04W 72/14* (2013.01); *H04W 74/006* (2013.01)

(58) Field of Classification Search
None
See application file for complete search history.

(56) References Cited

U.S. PATENT DOCUMENTS

2017/0048880 A1    2/2017 Anderson et al.
2017/0111921 A1*   4/2017 Fan ................... H04W 72/1242
(Continued)

FOREIGN PATENT DOCUMENTS

| KR | 1020160093573 | 8/2016 |
|---|---|---|
| WO | WO2016065620 | 5/2016 |

(Continued)

OTHER PUBLICATIONS

ASUSTeK, "Discussion on Autonomous UL Access for LAA," R1-1709048, 3GPP TSG RAN WG1 Meeting #89, Hangchou, China, dated May 15-19, 2017, 3 pages.

(Continued)

*Primary Examiner* — Clemence S Han
(74) *Attorney, Agent, or Firm* — Fish & Richardson P.C.

(57) ABSTRACT

The present invention relates to a wireless communication system. More specifically, the present invention relates to a method and a device for handling pre-configured UL resources based on LBT procedure in wireless communication system, the method comprising: receiving information for UL resource configuration from a network, in a state that the UE is configured with at least one serving cell operating in an unlicensed spectrum; performing LBT operation for transmission of uplink data by using the UL resource, wherein the UE starts counting a number of failures of the LBT operation once the UE is not allowed to use the UL resource for transmission of uplink data during the LBT operation, and when the number of failures of the LBT operation reaches to the maximum number of LBT failure, stopping using the UL resource.

8 Claims, 11 Drawing Sheets

(51) Int. Cl.
  *H04W 16/14* (2009.01)
  *H04W 72/04* (2009.01)
  *H04W 72/14* (2009.01)
  *H04W 74/00* (2009.01)

(56) References Cited

U.S. PATENT DOCUMENTS

| | | | |
|---|---|---|---|
| 2018/0124612 A1* | 5/2018 | Babaei | H04W 16/14 |
| 2018/0124831 A1* | 5/2018 | Dinan | H04L 41/0813 |
| 2018/0139767 A1* | 5/2018 | Lee | H04W 72/1205 |
| 2018/0176961 A1* | 6/2018 | Babaei | H04W 74/0833 |
| 2019/0124690 A1* | 4/2019 | Siomina | H04W 48/16 |

FOREIGN PATENT DOCUMENTS

| | | |
|---|---|---|
| WO | WO2016072908 | 5/2016 |
| WO | WO2016164584 | 10/2016 |
| WO | WO2017024399 | 2/2017 |
| WO | WO2017047973 | 3/2017 |
| WO | WO2017111331 | 6/2017 |

OTHER PUBLICATIONS

EP Extended European Search Report in European Appln. No. 18844628.0, dated Feb. 17, 2021, 11 pages.
Ericsson, "On Autonomous UL Transmissions for NR in Unlicensed Spectrum," R1-1713985, 3GPP TSG RAN WG1 Meeting #90, Prague, Czech Republic, dated Aug. 21-25, 2017, 3 pages.
JP Office Action in Japanese Appln. No. 2020-503316, dated Mar. 16, 2021, 7 pages (with English translation).
Broadcom Limited, CableLabs, "Discussion on multiple starting and ending positions for UL in LAA," R1-1709058, 3GPP TSG-RAN WG1 Meeting #89, Hangzhou, dated May 15-19, 2016, 6 pages.
Ericsson, "On Autonomous UL Transmissions for NR in Unlicensed Spectrum," R1-1708956, 3GPP TSG RAN WG1 Meeting #89, Hangzhou, P.R. China, dated May 15-19, 2017, 3 pages.
PCT International Search Report and Written Opinion in International Application No. PCT/KR2018/008924, dated Nov. 29, 2018, 10 pages.
Sequans Communications, "On additional starting and ending points in LAA UL subframe," R1-1708880, 3GPP TSG RAN WG1 Meeting #89, Hangzhou, China, dated May 15-19, 2017, 3 pages.
Office Action in Japanese Appln. No. 2020-503316, dated Dec. 7, 2021, 7 pages (with English translation).

* cited by examiner

【Figure 1】
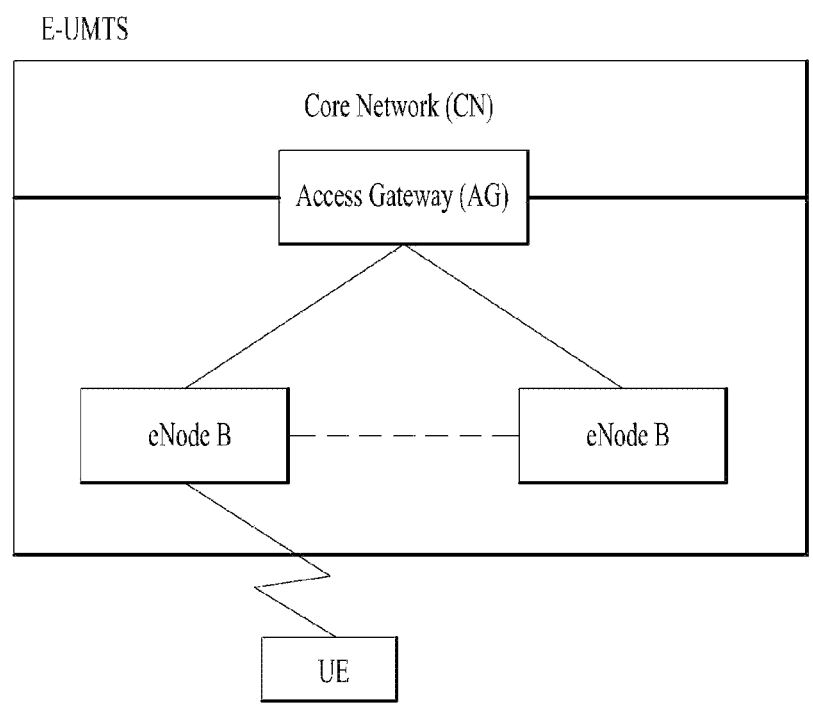

【Figure 2a】
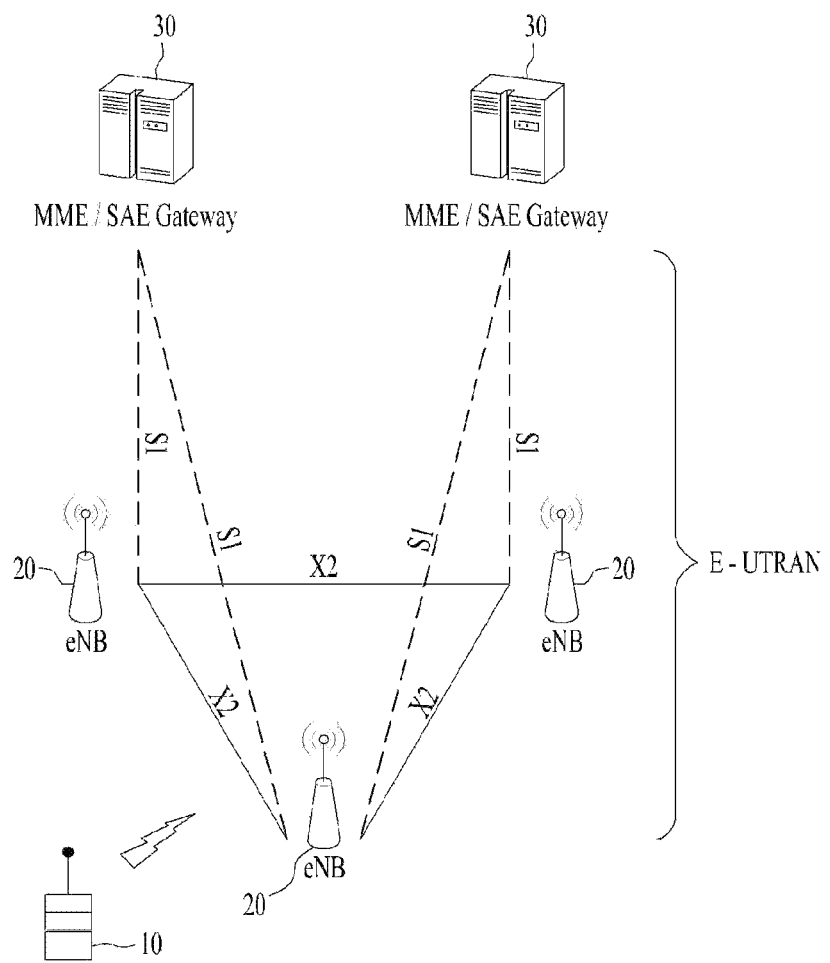

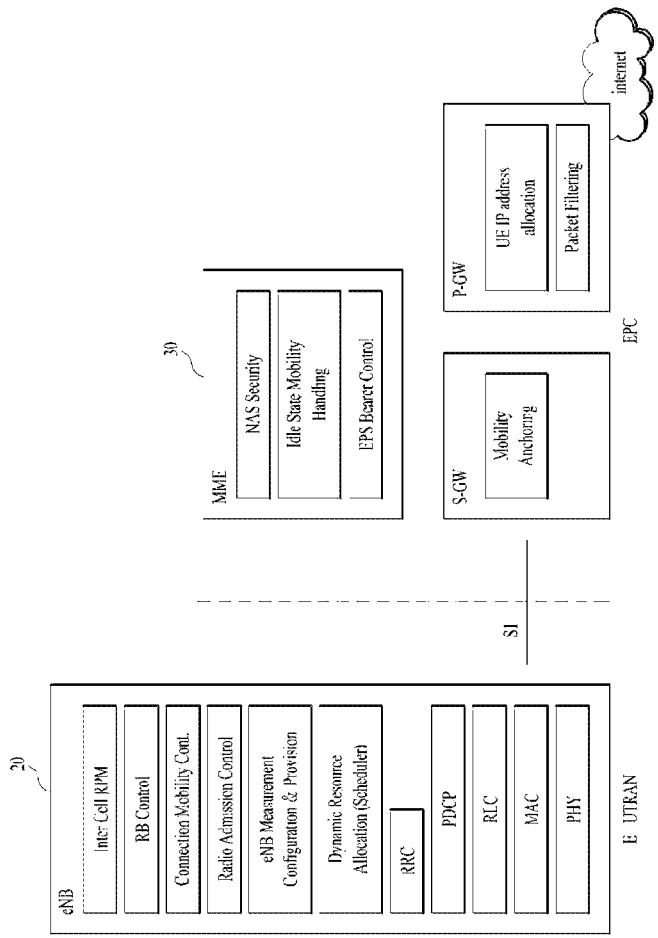
[Figure 2b]

[Figure 3]
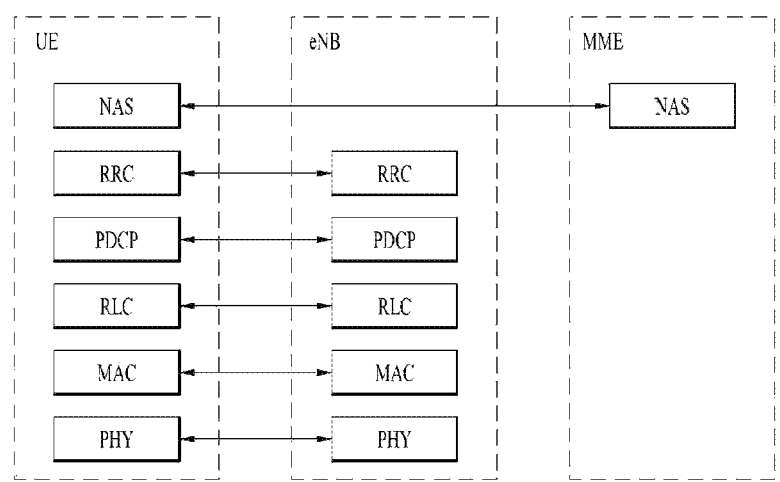
( a ) Control-Plane Protocol Stack
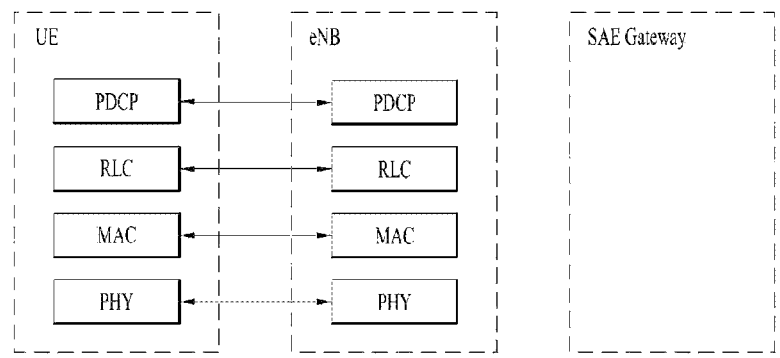
( b ) User-Plane Protocol Stack

[Figure 4a]
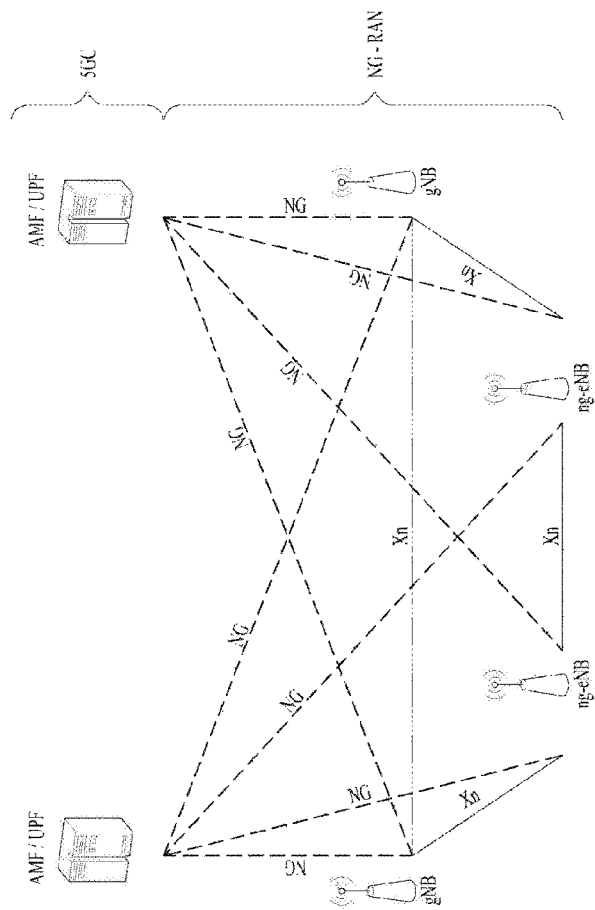

[Figure 4b]
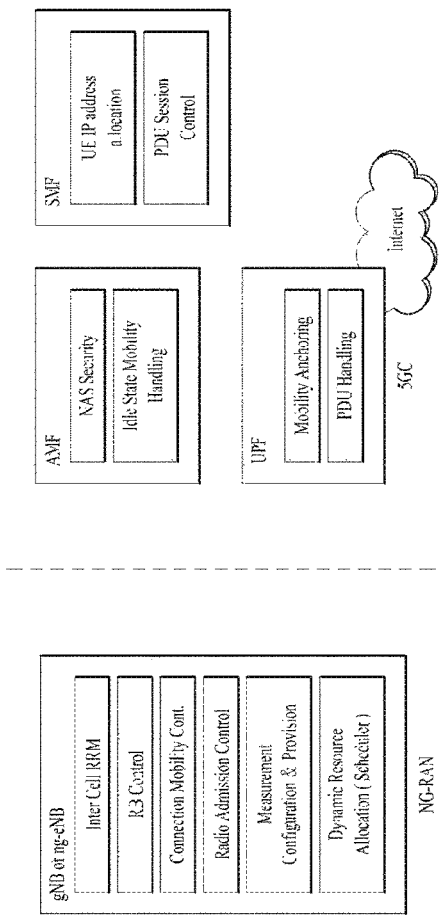

【Figure 5】
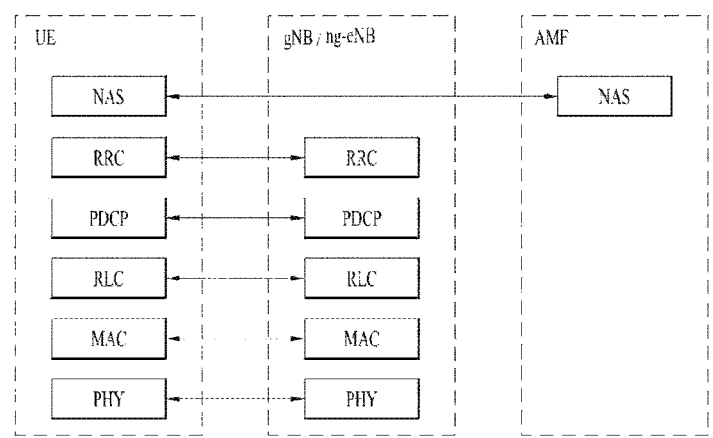
(a) Control-Plane Protocol Stack
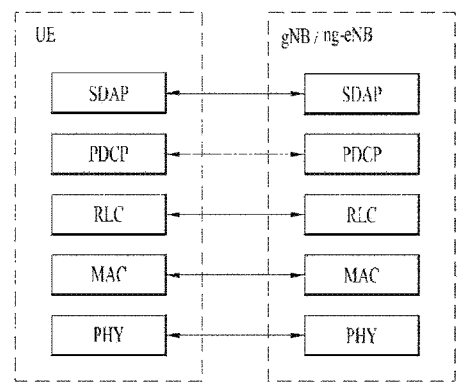
(b) User-Plane Protocol Stack 【Figure 6】
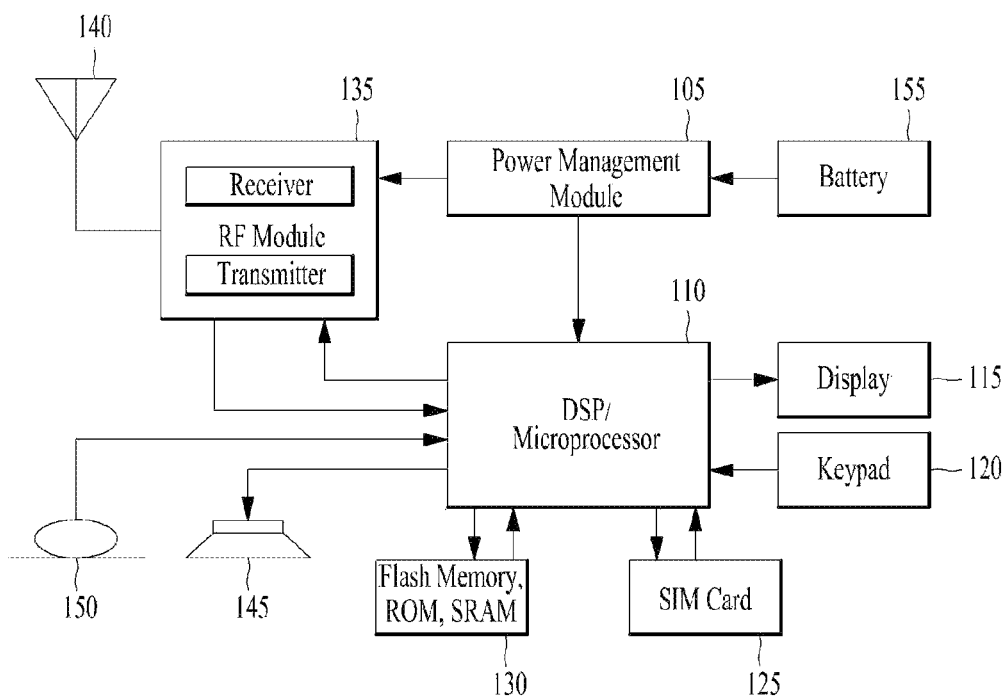
【Figure 7】
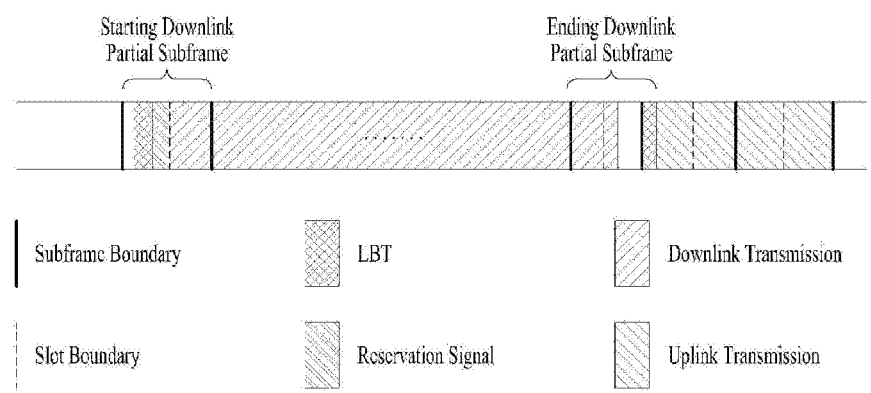

[Figure 8]
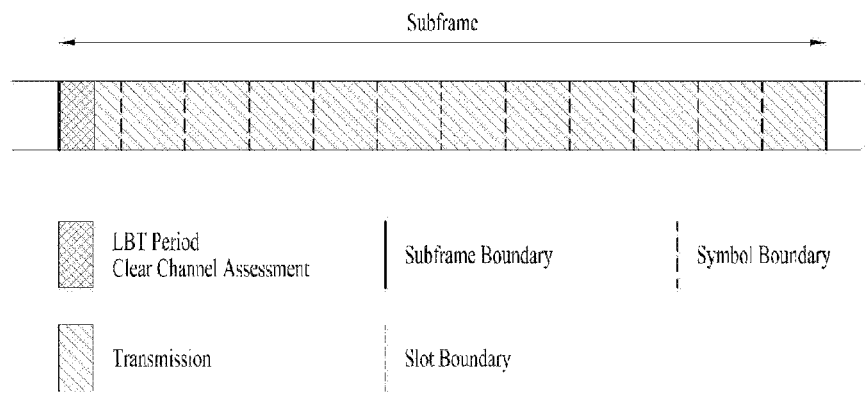
[Figure 9a]
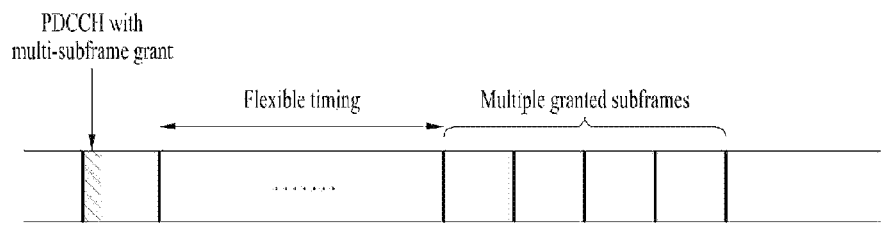
[Figure 9b]
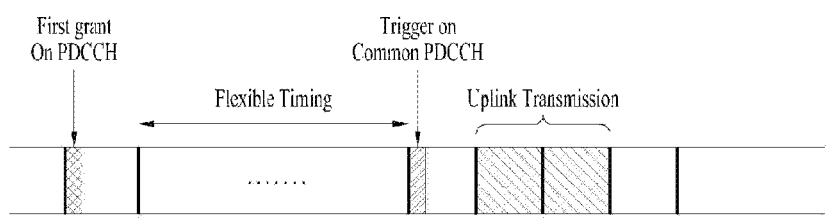

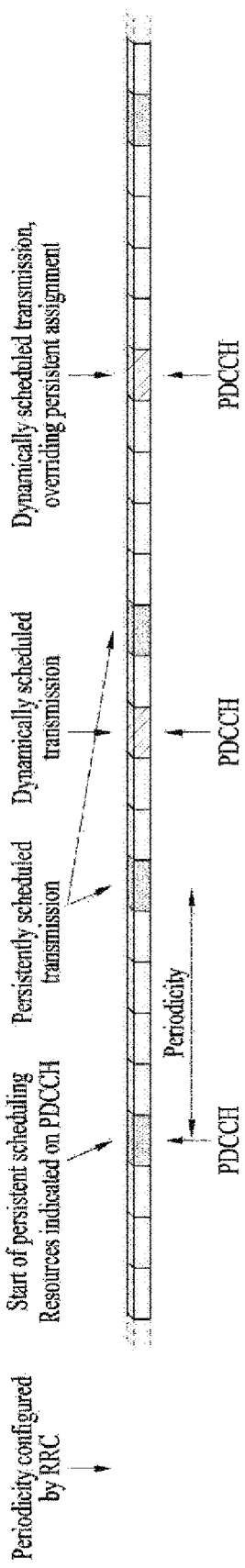
[Figure 10]

【Figure 11】
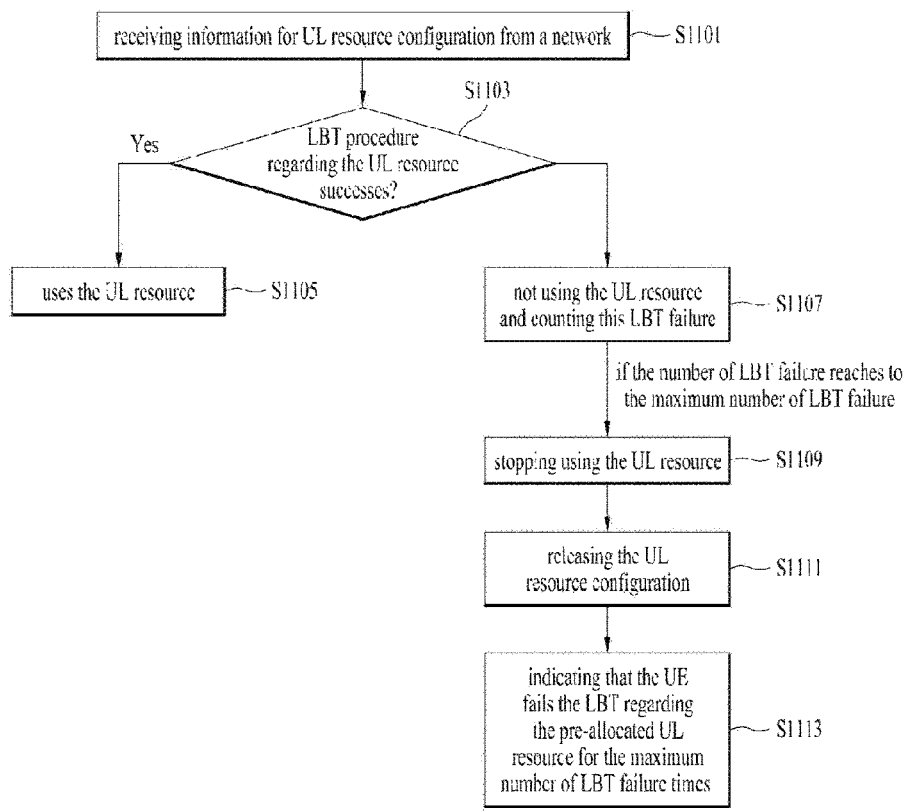

METHOD FOR HANDLING PRE-CONFIGURED UL RESOURCES BASED ON LBT PROCEDURE IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/008924, filed on Aug. 7, 2018, which claims the benefit of U.S. Provisional Application No. 62/544,004, filed on Aug. 11, 2017. The disclosures of the prior applications are incorporated by reference in their entirety.

TECHNICAL FIELD

The present invention relates to a wireless communication system and, more particularly, to a method for handling pre-configured UL resources based on LBT procedure in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for handling UL resource based on LBT procedure in wireless communication system.

In use of unlicensed band, although the eNB performs LBT to schedule the UE, the occupancy of the allocated UL resource can change when the UE actually uses it. Due to unexpected change of occupancy state, there is a risk that many of the UL grants are wasted as the UE fails at LBT. To resolve this issue, two additional scheduling schemes have been introduced in Rel-14 LAA. One is the multi-subframe scheduling and the other one is 2-step scheduling using PUSCH trigger A and B.

Both schemes aim at increasing the LBT success probability in the UE side. However, both schemes require the eNB to monitor the occupancy carefully in order to give a suitable uplink resource based on eNB LBT. For example, the eNB still needs to seize a good chance based on eNB LBT to give multiple subframes of UL resource or to order PUSCH trigger B. It could be considered as a burden to the eNB as it is hardly expected when the UL resource is busy or not. In addition, the eNB LBT might be considered useless or redundant because the final decision of using the allocated UL resource is anyway to be made by the UE. Perhaps, it would be better for the eNB to pre-allocate the UL resource without LBT and rely on UE LBT whether to use the pre-allocated UL resource or not.

In pre-allocation of the UL resource, the UE would prefer longer period of UL resource in order to increase the UE LBT success probability. However, as the amount of the UL resource is limited, it wouldn't be possible for one UE to monopolize the UL resource for a long time. In this sense, LTE SPS could be a good alternative because the SPS resource occurs periodically.

In LTE SPS, use of SPS resource needs to be activated and deactivated by PDCCH. In addition, the SPS resource occurs periodically and on one subframe each SPS interval. This wouldn't be suitable for LAA as SPS resource occupancy would also chance from time to time.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, if a UE is configured with a pre-allocated UL resource, the UE stops using the pre-allocated UL resource if the UE fails a Listen-Before-Talk operation for a certain period regarding the use of the pre-allocated UL resource.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is a diagram for exemplary of frame structure for Licensed-Assisted Access (LAA);

FIG. 8 is an example of LBT operation;

FIG. 9A is an example of Multi-subframe Grant of LAA, and FIG. 9B is an example of Triggered Grant of LAA;

FIG. 10 is a diagram for exemplary of semi-persistent scheduling;

FIG. 11 is a conceptual diagram for handling pre-configured UL resources based on LBT procedure in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway. A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is a diagram for exemplary of frame structure for Licensed-Assisted Access (LAA).

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to Frame structure Type 3, also called LAA SCell. Unless otherwise specified, LAA SCells act as regular SCells.

Frame structure Type 3 is applicable to LAA secondary cell operation with normal cyclic prefix only. Each 10 ms radio frame is divided into ten equally sized sub-frames. Each sub-frame consists of two equally sized slots. The 10 subframes within a radio frame are available for downlink or uplink transmissions. Similar to the LTE time division duplex (TDD), the uplink and downlink operations using frame structure type 3 are on the same frequency channel but are separated in time. However, unlike in LTE TDD, a subframe is not configured as a downlink subframe or an uplink subframe and may be used by either the base station or the wireless device.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with TS 36.133.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

Which LBT type (i.e. type 1 or type 2 uplink channel access) the UE applies is signalled via uplink grant for uplink PUSCH transmission on LAA SCells.

For uplink LAA operation, the eNB shall not schedule the UE more subframes than the minimum necessary to transmit all the traffic corresponding to the selected Channel Access Priority Class or lower (i.e, with a lower number in the Table 1), than the:
 Channel Access Priority Class signaled in UL grant based on the latest BSR and received uplink traffic from the UE if type 1 uplink channel access procedure is signalled to the UE;
 Channel Access Priority Class used by the eNB based on the downlink traffic, the latest BSR and received UL traffic from the UE if type 2 uplink channel access procedure is signalled to the UE.

TABLE 1

Mapping between Channel Access Priority Classes and QCI

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

Four Channel Access Priority Classes are defined in which can be used when performing uplink and downlink transmissions in LAA carriers. Table 1 shows which Channel Access Priority Class should be used by traffic belonging to the different standardized QCIs. A non-standardized QCI (i.e. Operator specific QCI) should use suitable Channel Access Priority Class based on the below table, i.e. the Channel Access Priority Class used for a non-standardized QCI should be the Channel Access Priority Class of the standardized QCIs which best matches the traffic class of the non-standardized QCI.

For uplink, the eNB selects the Channel Access Priority Class by taking into account the lowest priority QCI in a Logical Channel Group.

Enhanced licensed assisted access (eLAA) is a new LTE Release 14 mode of operation that provides the necessary technology for cellular operators to fully integrate the unlicensed spectrum into their networks. An enhancement to the Downlink-only LTE Release 13 LAA, the eLAA technology enables both uplink and downlink operation of LTE in unlicensed bands.

FIG. 8 is an example of LBT operation.

The Listen-Before-Talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In eLAA, channel access in both downlink and uplink rely on the listen-before-talk (LBT) feature. A wireless device or a base station must first "sense" the communications channel to find out there is no communications prior to any transmission. The "channel sensing" procedure relies on detecting the energy level on the communications channels. The LBT parameters (such as type/duration, clear channel assessment parameters, etc.) are configured in a wireless device by the base station.

FIG. 9A is an example of Multi-subframe Grant of LAA, and FIG. 9B is an example of Triggered Grant of LAA.

In use of unlicensed band, although the eNB performs LBT to schedule the UE, the occupancy of the allocated UL resource can change when the UE actually uses it. Due to unexpected change of occupancy state, there is a risk that many of the UL grants are wasted as the UE fails at LBT. To resolve this issue, two additional scheduling schemes have been introduced in Rel-14 LAA. One is the multi-subframe scheduling (FIG. 9A) and the other one is 2-step scheduling using PUSCH trigger A and B (FIG. 9B).

In the eLAA system, a base station can allocate resources in maximum of four multiple consecutive subframes to a wireless device using the multi-subframe grants (See, FIG.

9A). The eLAA system specifies two new downlink control information (DCI) formats (i.e., format OB and 4B) that the base station can transmit on the physical downlink control channel (PDCCH) to schedule resources for a wireless device in up to four consecutive subframes.

In the legacy LTE, a wireless device needs four subframes to process an uplink grant. The eLAA system enables fast resource allocation by specifying the triggered grants. The base station may first transmit a resource allocation command to the wireless device and may later transmit a trigger, with a short processing time, to indicate to the wireless device the time for transmission. The timing between resource allocation command and the trigger can be flexible (See, FIG. 9B).

Both schemes aim at increasing the LBT success probability in the UE side. In multi-subframe scheduling, as the UE is provided with at most 4 subframes, the UE LBT success probability could be increased. In 2-step scheduling, as there would be a very short time gap between the PUSCH trigger B and actual uplink transmission, it could be also helpful to increase the UE LBT success probability.

However, both schemes require the eNB to monitor the occupancy carefully in order to give a suitable uplink resource based on eNB LBT. For example, the eNB still needs to seize a good chance based on eNB LBT to give multiple subframes of UL resource or to order PUSCH trigger B. It could be considered as a burden to the eNB as it is hardly expected when the UL resource is busy or not. In addition, the eNB LBT might be considered useless or redundant because the final decision of using the allocated UL resource is anyway to be made by the UE. Perhaps, it would be better for the eNB to pre-allocate the UL resource without LBT and rely on UE LBT whether to use the pre-allocated UL resource or not.

FIG. 10 is a diagram for exemplary of semi-persistent scheduling.

The purpose of the scheduler is to determine to/from which UE(s) to transmit data and on which set of resource blocks. The base station is a key element and to a large degree determines the over-all behavior of the system. The basic operation is so-called dynamic scheduling, where the eNodeB in each 1 ms TTI transmits scheduling information to the selected set of terminals, controlling the uplink and downlink transmission activity. The scheduling decisions are transmitted on the PDCCHs. To reduce the control signaling overhead, there is also the possibility of semi-persistent scheduling.

For carrier aggregation, each component carrier is independently scheduled with individual scheduling assignments/grants and one DL-SCH/UL-SCH per scheduled component carrier. Semi-persistent scheduling is only supported on the primary component carriers, motivated by the fact that the main usage is for small payloads not requiring multiple component carriers.

The downlink scheduler is responsible for dynamically controlling the terminal(s) to transmit to and, for each of these terminals, the set of resource blocks upon which the terminal's DL-SCH (or DL-SCHs in the case of carrier aggregation) is transmitted).

The uplink scheduler dynamically controls which UEs are to transmit on their UL-SCH (or UL-SCHs in the case of carrier aggregation) and on which uplink resources.

The basis for uplink and downlinks scheduling is dynamic scheduling with a new scheduling decision taken in each subframe allows for full flexibility in terms of the resources used and can handle large variations in the amount of data to transmit at the cost of the scheduling decision being sent on a PDCCH in each subframe. In many situations, the overhead in terms of control signaling on the PDCCH is well motivated and relatively small compared to the payload on DL-SCH/UL-SCH. However, some services, most notably voice-over IP, are characterized by regularly occurring transmission of relatively small payloads. To reduce the control signaling overhead for those services, LTE provides semi-persistent scheduling in addition to dynamic scheduling.

With semi-persistent scheduling, the UE is provided with the scheduling decision on the PDCCH, together with an indication that this applies to every nth subframe until further notice. Hence, control signaling is only used once and the overhead is reduced, as illustrated in FIG. 10. The periodicity of semi-persistently scheduled transmissions (that is, the value of n) configured by RRC signaling in advance, while activation and deactivation are done using the PDCCH using the semi-persistent C-RNTI. For example, for voice-over IP the scheduler can configure a periodicity of 20 ms for semi-persistent scheduling and, once a talk spurt starts, the semi-persistent pattern is triggered by the PDCCH.

After enabling semi-persistent scheduling, the terminal continues to monitor the PDCCH for uplink and downlink scheduling commands. When a dynamic scheduling command is detected, it takes precedence over the semi-persistent scheduling in that particular subframe, which is useful if the semi-persistently allocated resources occasionally need to be increased. For example, for voice-over IP in parallel with web browsing it may be useful to override the semi-persistent resource allocation with a larger transport block when downloading the web page.

For the downlink, only initial transmissions use semi-persistent scheduling. Retransmissions are explicitly scheduled using a PDCCH assignment. This follows directly from the use of an asynchronous hybrid-ARQ protocol in the downlink. Uplink retransmissions, in contrast, can either follow the semi-persistently allocated subframes or be dynamically scheduled.

Semi-persistent scheduling is only supported on the primary component carrier and any transmission on a secondary component carrier must be dynamically scheduled. This is reasonable as semi-persistent scheduling is intended for low-rate services for which a single component carrier is sufficient.

According to legacy LTE specification, the base station provides an SPS resource configuration via RRC signaling to the UE, and the UE configures SPS resources based on the SPS resource configuration on the primary component carrier, even though the UE configures multiple component carriers.

Meanwhile, in case of NR, in order to provide a service-specific dedicated network to various services of a different property, the primary component carrier and the secondary component carrier can serve different types of data, independently. In this case, semi-persistent scheduling had better be applied to not only the primary component carrier but also the secondary component carrier, because the secondary component carrier doesn't depend on the primary component carrier anymore.

In addition, two types of configured uplink grants are defined in NR: i) with Type 1, RRC directly provides the configured uplink grant (including the periodicity), and ii) with Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivate.

When a configured uplink grant is active, if the UE cannot find its C-RNTI/CS-RNTI on the PDCCH(s), an uplink transmission according to the configured uplink grant can be made. Otherwise, if the UE finds its C-RNTI/CS-RNTI on the PDCCH(s), the PDCCH allocation overrides the configured uplink grant.

When CA is configured, at most one configured uplink grant can be signalled per serving cell. When BA is configured, at most one configured uplink grant can be signalled per BWP. On each serving cell, there can be only one configured uplink grant active at a time. A configured uplink grant for one serving cell can either be of Type 1 or Type 2. For Type 2, activation and deactivation of configured uplink grants are independent among the serving cells. When SUL is configured, a configured uplink grant can only be signalled for one of the 2 ULs of the cell. The Type 2 of Configured Grant is same as LTE SPS.

In Type 2 of Configured Grant (or LTE SPS), the UE would prefer longer period of UL resource in order to increase the UE LBT success probability. However, as the amount of the UL resource is limited, it wouldn't be possible for one UE to monopolize the UL resource for a long time. In this sense, LTE SPS could be a good alternative because the SPS resource occurs periodically. In Type 2 of Configured Grant (or LTE SPS), use of pre-allocation of the UL resource needs to be activated and deactivated by PDCCH. In addition, the pre-allocation of the UL resource occurs periodically and on one subframe each SPS interval. This wouldn't be suitable for LAA as SPS resource occupancy would also chance from time to time. Therefore, we could consider some enhancement in SPS.

FIG. 11 is a conceptual diagram for handling pre-configured UL resources based on LBT procedure in wireless communication system according to embodiments of the present invention.

In this invention, if a UE is configured with a pre-allocated UL resource, the UE stops using the pre-allocated UL resource if the UE fails a Listen-Before-Talk operation for a certain period regarding the use of the pre-allocated UL resource.

When the UE is configured with at least one serving cell operating in an unlicensed spectrum (i.e. LAA operation), the UE receives information for uplink (UL) resource configuration from a network (S1101).

Preferably, the UL resource configuration includes pre-allocated UL resources and the maximum number of LBT failure regarding the UL resources.

The pre-allocated UL resource refers to the uplink resources that the UE can use without PDCCH including: i) Semi-Persistent Scheduling (SPS) resource, ii) Grant-free resource, iii) Contention based uplink resource, or iv) any uplink resource other than dynamic UL grant using PDCCH.

Preferably, the maximum number of LBT failure regarding the UL resource is the maximum number of consecutive LBT failure since the UE starts to use the UL resource, or the maximum number of total aggregated LBT failure since the UE starts to use the UL resource.

In addition, the UL resource configuration further includes interval of UL resource (e.g., number of radio frames or subframes) or length of UL resource (e.g., number of subframes/slots or absolute time periods).

For example, if the UL resource configuration indicates interval of UL resource, the UL resource periodically occurs with the indicated interval. If the UL resource configuration indicates length of UL resource, the UL resource occurs for the indicated length per interval.

After the UE is configured with the pre-allocated UL resource, the UE performs Listen-Before-Talk (LBT) operation for transmission of uplink data by using the UL resource.

The UE starts to use the UL resource upon reception of activation command from the network (e.g. Type 2) or immediately after being configured with the pre-allocated UL resource (e.g. Type 1).

After starting to use the pre-allocated UL resource, when the pre-allocated UL resource occurs on a time point, e.g., on a subframe, the UE performs LBT regarding the pre-allocated UL resource in order to check whether it is allowed to use the pre-allocated UL resource or not (S1103).

If LBT successes, the UE uses the pre-allocated UL resource (S1105). The LBT success means that the UE is allowed to use the UL resource for data transmission because the UL resource is not used/taken by other UE, which could be Cellular UE or Wi-Fi UE.

If LBT fails, the UE doesn't use the pre-allocated UL resource and the UE counts this LBT failure (S1107).

The LBT failure means that the UE is not allowed to use the UL resource for data transmission because the UL resource is already used/taken by other UE, which could be Cellular UE or Wi-Fi UE.

In counting the number of failures of the LBT operation, the UE counts all LBT failure regarding the pre-allocated UL resource, or the UE counts only the consecutive failure regarding the pre-allocated UL resource.

In order to count the number of LBT failure of the pre-allocated UL resource, the UE has a counter counting the number of LBT failure regarding the pre-allocated UL resource.

If there are multiple pre-allocated UL resource, the UE counts the number of LBT failure for each of the pre-allocated UL resources.

Preferably, the UE starts counting the number of LBT failure once the UE starts using the pre-allocated UL resource.

And when the UE starts counting the number of LBT failure, or after the counter reaches to the maximum value, or the UE indicates to the eNB that the number of LBT failure reaches to maximum value regarding the pre-allocated UL resource, or the UE deactivates/releases the pre-allocated UL resource, the UE resets the counter.

Anyway, if the number of LBT failure reaches to the maximum number of LBT failure, the UE stops using the pre-allocated UL resource which occurs after this time point (S1109), and the UE further releases the configuration of the pre-allocated UL resource (S1111).

In addition, the UE indicates to the base station that the UE fails the LBT regarding the pre-allocated UL resource for the maximum number of LBT failure times (S1113).

If there are multiple pre-allocated UL resources, the UE indicates for which of the pre-allocated UL resource the number of LBT failure reaches to the maximum value.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NRsystem.

The invention claimed is:

1. A method for a User Equipment (UE) operating in a wireless communication system, the method comprising:
receiving information for uplink (UL) resource configuration from a network, in a state that the UE is configured with at least one serving cell operating in an unlicensed spectrum;
wherein the information for the UL resource configuration includes information related to a UL resource and information related to a maximum number of Listen-Before-Talk (LBT) failure used for detecting the LBT failure of the UL resource;
performing LBT operation for transmission of uplink data by using a UL resource, wherein the UE starts counting a number of failures of the LBT operation once the UE is not allowed to use the UL resource for transmission of uplink data during the LBT operation, and
based on a number of total aggregated failures of the LBT operation related to a UL resource reaching the maximum number of LBT failure during a period since the UE starts to use the UL resource, stopping using the UL resource,
wherein based on multiple UL resources being configured, the UE indicates to the network which UL resource the number of total aggregated failures of the LBT operation reaches the maximum number of LBT failure, and
wherein the information related to the UL resource includes information indicating interval and information indicating length in units of subframes or slots for each of the multiple UL resources, and the UL resource occurs for the indicated length per the interval.

2. The method according to claim 1, further comprising:
releasing the UL resource configuration, based on the number of total aggregated failures of the LBT operation reaching the maximum number of LBT failure.

3. The method according to claim 1, wherein the maximum number of LBT failure is a maximum number of total aggregated LBT failure since the UE starts to use the UL resource.

4. The method according to claim 1, further comprising:
resetting counting the number of failures of the LBT operation, based on:
the UE starting the counting of the number of failures of the LBT operation; or
the number of total aggregated failures of the LBT operation reaching the maximum number of LBT failure; or
the UE indicating to the network that the number of total aggregated failures of the LBT operation reaches the maximum number of LBT failure regarding the UL resource; or
the UE deactivating or releasing the UL resource.

5. A user equipment (UE) configured to operate in a wireless communication system, the UE comprising:
a Radio Frequency (RF) module; and
a processor operably coupled with the RF module and configured to:
receive information for uplink (UL) resource configuration from a network, in a state that the UE is configured with at least one serving cell operating in an unlicensed spectrum,
wherein the information for the UL resource configuration includes information related to a UL resource and information related to a maximum number of Listen-Before-Talk (LBT) failure used for detecting the LBT failure of the UL resource;
perform LBT operation for transmission of uplink data by using a UL resource, wherein the UE starts counting a number of failures of the LBT operation once the UE is not allowed to use the UL resource for transmission of uplink data during the LBT operation, and
based on a number of total aggregated failures of the LBT operation related to a UL resource reaching the maximum number of LBT failure during a period since the UE starts to use the UL resource, stop using the UL resource,
wherein based on multiple UL resources being configured, the UE indicates to the network which UL resource the number of total aggregated failures of the LBT operation reaches the maximum number of LBT failure, and wherein the information related to the UL resource includes information indicating interval and information indicating length in units of subframes or slots for each of the multiple UL resources, and the UL resource occurs for the indicated length per the interval.

6. The UE according to claim 5, wherein the processor is further configured to:
release the UL resource configuration, based on the number of total aggregated failures of the LBT operation reaching the maximum number of LBT failure.

7. The UE according to claim 5, wherein the maximum number of LBT failure is a maximum number of total aggregated LBT failure since the UE starts to use the UL resource.

8. The UE according to claim 5, wherein the processor is further configured to:
reset counting the number of failures of the LBT operation, based on:
the UE starting the counting of the number of failures of the LBT operation; or
the number of total aggregated failures of the LBT operation reaching the maximum number of LBT failure; or
the UE indicating to the network that the number of total aggregated failures of the LBT operation reaches the maximum number of LBT failure regarding the UL resource; or
the UE deactivating or releasing the UL resource.

* * * * *